United States Patent [19]
Todd, Jr.

[11] 3,959,584
[45] May 25, 1976

[54] CATHODOCHROMIC CRT PROJECTION DISPLAY

[75] Inventor: Lee T. Todd, Jr., Lexington, Ky.

[73] Assignee: Massachusetts Institute of Technology, Cambridge, Mass.

[22] Filed: July 19, 1974

[21] Appl. No.: 489,965

[52] U.S. Cl............................. 178/7.88; 178/7.85; 178/DIG. 31; 350/160 R; 313/465
[51] Int. Cl.² ........................................ H01J 29/89
[58] Field of Search.......... 178/DIG. 31, 7.85, 7.88; 350/160 R; 313/465

[56] References Cited
UNITED STATES PATENTS

| | | | |
|---|---|---|---|
| 3,253,497 | 5/1966 | Dreyer............................... | 178/7.87 |
| 3,317,665 | 5/1967 | Perlowsky.......................... | 178/7.87 |
| 3,345,462 | 10/1967 | Good................................. | 178/7.87 |
| 3,581,134 | 5/1971 | Johnson............................. | 178/7.87 |
| 3,705,323 | 12/1972 | Shidlovsky.......................... | 313/465 |
| 3,715,618 | 2/1973 | Paley................................. | 313/465 |
| 3,774,233 | 11/1973 | Dueringer.......................... | 178/7.87 |

OTHER PUBLICATIONS

P. M. van Alphen and H. Rinia, "Projection–Television Receiver," Philips Tech. Rev. 10(3), 69, 1948.

*Primary Examiner*—Howard W. Britton
*Assistant Examiner*—Michael A. Masinick
*Attorney, Agent, or Firm*—Arthur A. Smith, Jr.; Robert Shaw; Martin M. Santa

[57] ABSTRACT

A cathode-ray tube projection system employing a cathodochromic image screen and electron beam erase and in which the image is projected from the image screen surface nearest the electron gun. The main advantages of this system are higher resolution and improved image erasure which provides a high-contrast image.

20 Claims, 8 Drawing Figures

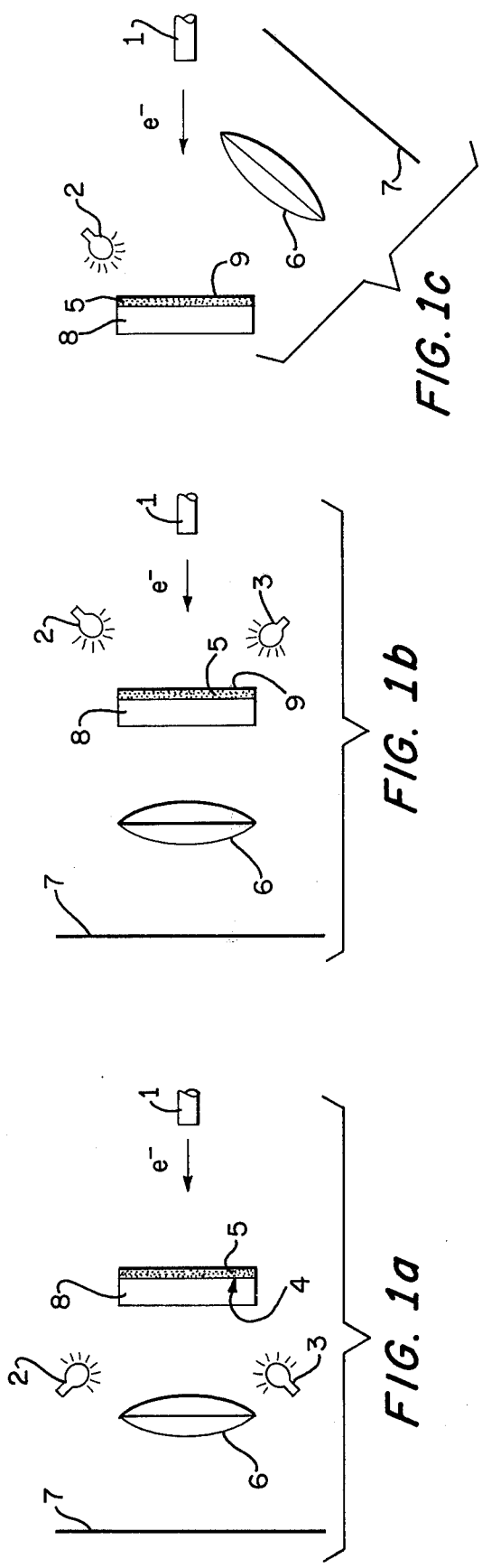
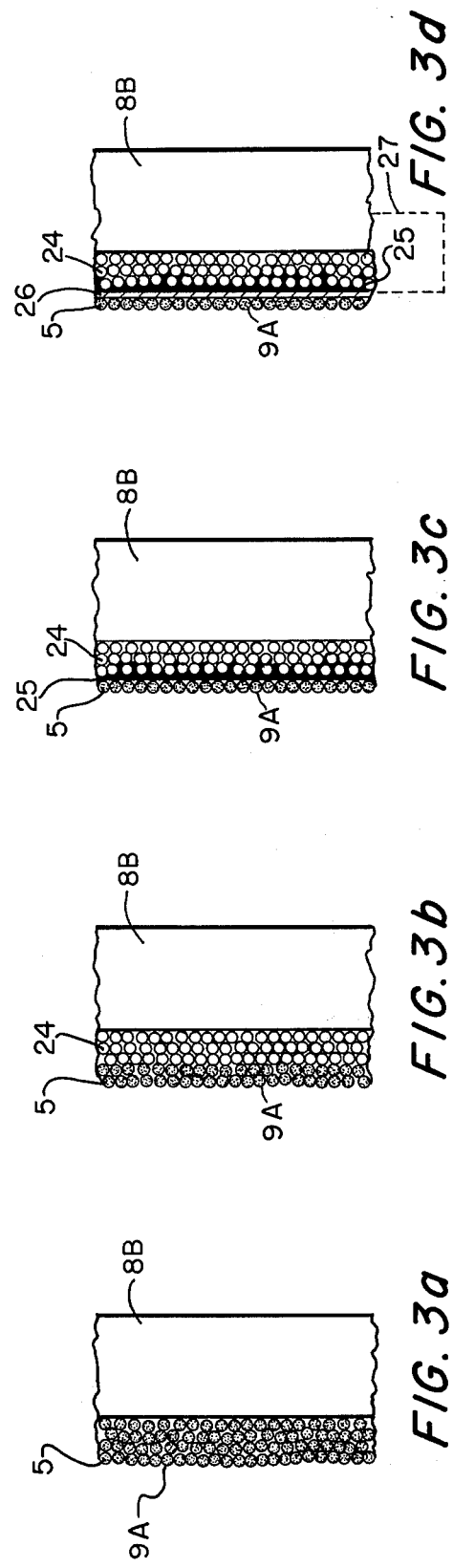

CATHODOCHROMIC CRT PROJECTION DISPLAY

The invention herein disclosed was in part funded by a contract with the U.S. Department of Defense, Advanced Research Project Agency.

The present invention relates to projection cathode-ray tube display systems.

Attention is called to an application for Letters Patent, of the present inventor, entitled "Cathode Ray Tube Employing Faceplate-Deposited Cathodochromic Material and Electron Beam Erase," Ser. No. 457,111, filed Apr. 1, 1974. There accompany herewith two articles from Philips Technical Review (P. M. van Alphen and H. Rinia, Philips Tech. Rev. 10(3), 69, 1948; J. Haantjes and C. J. van Loon, Philips Tech. Rev. 15(1), 27, 1953) which describe various means for projecting images from cathode ray tubes (CRT) for television. In each projection scheme presented in the articles, the image is projected from the front surface of the CRT. However, the basic optical design has been adapted for rear screen projection by Advent Corporation, Cambridge, Mass. In each case the projected image is produced by light emitted from a phosphor image screen. The present invention is concerned with the projection of an image from the rear surface of a cathodochromic image screen using reflective rather than emitted light and electron beam erase of said image.

Projection of cathode ray tube (CRT) images is desired for many uses. Standard phosphor CRT displays do not emit sufficient light for high contrast projected images. If their emission intensity is increased to improve contrast, a loss in resolution results. In contrast to phosphors, cathodochromic materials have the property that they do not emit light but rather change color when excited by an electron beam beyond some threshold. In the case of cathodochromic bromine sodalite, some of the coloration can be bleached by visible light, optical mode coloration, but the remaining coloration, thermal mode coloration, remains indefinitely and the material must be heated to approximately 200°C to cause erasure. Since the induced thermal mode coloration is unaffected by exposure to visible light, the images on the screen of a cathodochromic CRT can be projected by either reflecting light from the screen surface or transmitting light through the screen. In the former case, the device operates in a manner similar to an opaque projector. In the latter case, this screen acts as a light valve — passing light in the uncolored areas and absorbing it in the colored areas.

An economical and technically feasible method of erasing the image of a cathodochromic CRT is electron beam heating. In this method, the image is written on the screen with an electron beam exposure sufficient to cause coloration but no significant heating. The image is then removed by scanning the screen, in a raster pattern, with an electron beam exposure such that the screen temperature is raised above the erasure threshold. Using this technique, the erase time is proportional to the screen area. Therefore, by reducing the desired information to a small area and then projecting and optically magnifying the image up to the desired size, the erase time can be greatly reduced.

A principal object of the present invention is to provide a cathodochromic CRT projection system, using electron beam erase, with optimum resolution, erasure and contrast characteristics.

A further object is to provide an image screen with improved erasure, resolution and contrast characteristics.

These and still further objects are discussed hereinafter and are particularly delineated in the appended claims.

The objects are attained by a cathodochromic CRT projection system in which the image is projected from the major surface of the image screen nearest the electron gun. This configuration offers several advantages over previously proposed arrangements in which the image is projected by reflecting light off the front image screen surface or by transmitting light through the image screen. Both prior arrangements offer lower resolution than the rear screen projection mode. Also, when using electron beam erase, the alternative methods offer a lower image contrast ratio. The improvement in contrast ratio for the rear screen projection mode occurs because the particles composing the rear screen surface are thermally insulated from the substrate by the porosity of the particle layers between the substrate and the rear surface. Therefore, the temperature of the rear surface particles can be increased to the erase threshold without significant heat loss to the substrate which is not the case for those particles adhered directly to the substrate. The quality of rear surface erasure can be further improved by placing a thick layer of unsensitized particles between the substrate and the layer, or layers, of active particles which constitute the image screen. Since the unsensitized particles do not color under electron beam exposure, this construction not only provides a thermal buffer between active layer and substrate but it also prohibits any "deep" coloration into the screen which might cause a background coloration buildup.

The material used for the image screen in the above system may be any cathodochromic powder. However, the material used in most device studies is sensitized bromine sodalite, $Na_6Al_6Si_6O_{24} 2(1-z)NaX$, wherein $z$ is the fraction of NaX vacancies formed by hydrogen annealing and X is Br or a mixture of Br and OH. The thermal buffer layer mentioned may be unsensitized bromine sodalite or any other unsensitized white powder with a particle size sufficient to insure adequate porosity.

The invention is hereinafter discussed with reference to the accompanying drawing in which:

FIG. 1a is a schematic representation of a prior art cathodochromic projection system in which the image is projected from the surface of the screen opposite the electron gun of a cathode ray tube (CRT);

FIG. 1b is a schematic representation of a prior art cathodochromic projection system in which the image is projected by transmission of light through the screen;

FIG. 1c is a schematic representation of a cathodochromic projection system of the present invention in which the image is projected from the surface of the screen nearest the electron gun, that is, the rear surface of the screen;

FIG. 3a is an expanded cross-sectional view of a portion of a cathodochromic image screen deposited on a substrate;

FIG. 3b is a view, similar to FIG. 3a, of a composite structure consisting of a cathodochromic image screen like that in FIG. 3a, a layer of unsensitized particles and a substrate;

Figure 2:
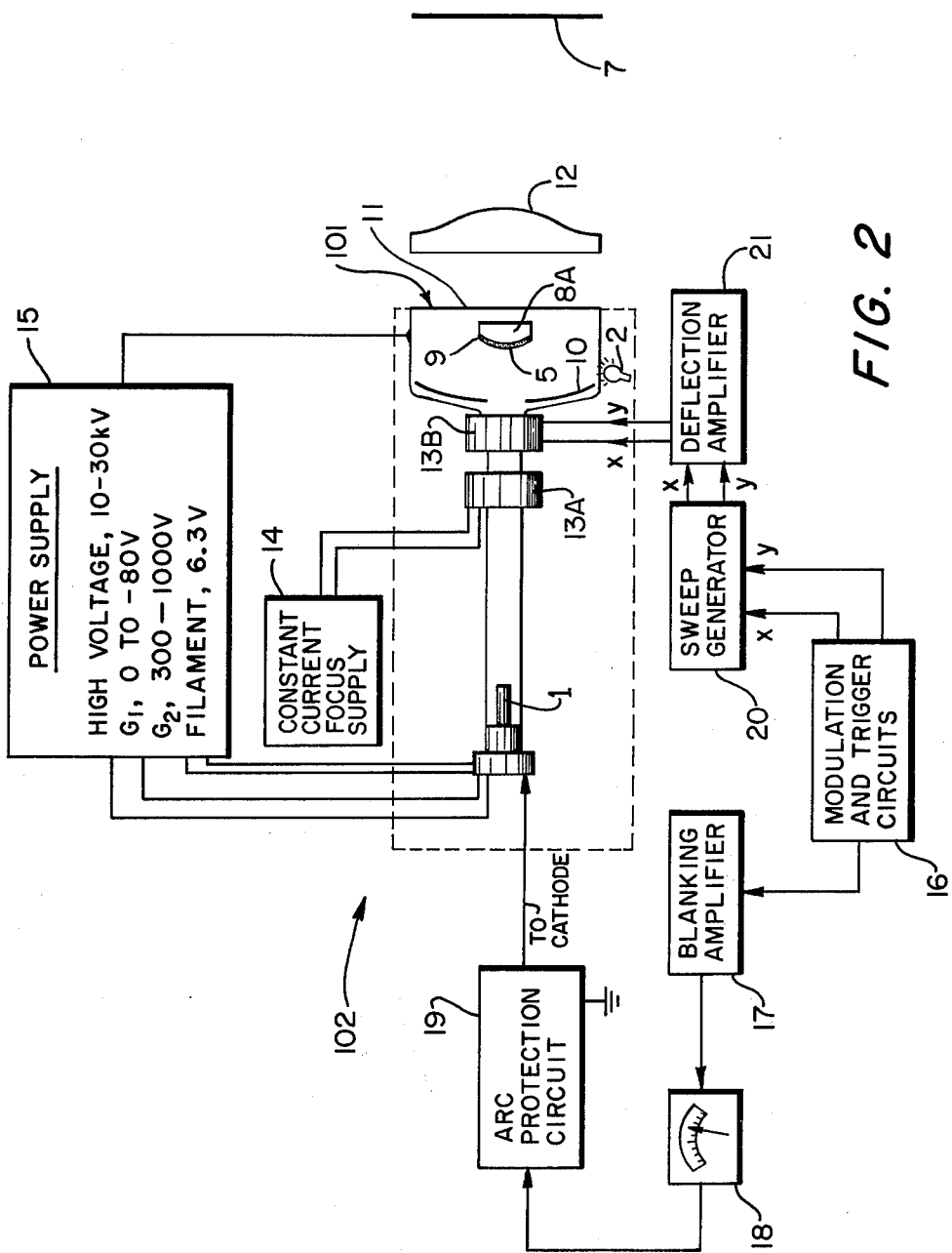
FIG. 2 is a diagrammatic representation of a CRT projection system employing rear screen projection and electron beam erase.

FIG. 3c is a view, similar to FIG. 3a, of a composite structure consisting of a cathodochromic image screen, like that in FIG. 3a, a microglass layer, a layer of unsensitized particles and a substrate; and FIG. 3d is a view, similar to FIG. 3a, of a composite structure consisting of a cathodochromic image screen, like that in FIG. 3a, a thin coating of aluminum, a microglass layer, a layer of unsensitized particles and a substrate.

In the description that follows, various elements that perform common functions are assigned the same or similar labels throughout.

The instant invention stems from the discovery that the image on the major surface of a cathodochromic image screen of a cathode ray tube (CRT) nearest the electron gun, that is, the surface upon which the electron beam first impinges upon the screen, is unexpectedly sharp, that the image can be projected by reflectant methods, and that the image if thus projected, is unusually sharp. In order to place the present invention in proper context, the description covers a number of projection schemes other than that to which the invention is directed.

There are three possible modes of projection to be considered: (1) front surface projection, (2) transmission projection and (3) rear surface projection. In each of these cases, information is written on the image screen by an electron beam (represented by $e^-$) from an electron gun 1, and also is erased by the same beam but at a higher level of exposure such that adequate heating occurs. In front surface projection, as shown in FIG. 1a, visible light from sources 2 and 3 is incident on the front surface shown at 4 of a cathodochromic image screen 5 and the reflected image is collected by a lens 6 which projects the image onto a viewing screen 7. Two disadvantages arise as a result of projecting the image in this way. First, when using electron beam erase, the particle surfaces adhered directly to the glass substrate labeled 8 are very difficult to erase since there is thermal transfer to the glass. As a result, these particle surfaces become permanently colored and cause a haze to appear over the image and, thus, a loss in contrast and gray scale capability. Although this effect can be partially eliminated by using a thin thermal buffer layer (see said application, Ser. No. 457,111), a slight loss in contrast still occurs. The second problem is a loss in resolution due to the fact that the writing electrons do not completely penetrate the image screen. Therefore, coloration of the particles near the front surface of the image screen occurs only as a result of scattered electrons. This scattering causes a wider colored area at the front surface than at the back surface and, thus, a loss in resolution.

In the transmission projection mode, FIG. 1b, light from the sources 2 and 3 impinges on the rear surface marked 9 of the cathodochromic image screen 5 and passes through the screen. In this case, the screen acts as a light valve in that it passes light in the uncolored areas and absorbs it in the colored areas. The transmitted image is collected by the lens 6 and projected onto a viewing screen 7. Here again the projected image suffers from the same problems as mentioned above for front surface projection, namely reduced contrast and resolution.

It has been found, for present purposes, as above noted, that the ideal surface for projection is the rear screen surface 9. A scheme for projection from the surface 9 is shown in FIG. 1c. In this case, light from the source 2 is incident on the rear surface 9 of the image screen 5 and the reflected image is collected by the lens 6 and projected onto the viewing screen 7. Since the rear surface is nearest the electron beam, it gets the hottest during erase and therefore erases best. Also, the particles which make up the back layer are thermally insulated from the thick substrate by the porosity of the preceding particle layers and, hence, the exposure necessary to raise their temperature to the erase threshold is reduced. Furthermore, since the electron beam impinges directly on the rear surface, the spot size of the electron beam is preserved and the resolution of the image is not limited by electron beam scattering as in the two previously discussed projection modes.

The essential parts of a rear-surface, cathodochromic projection system are shown at 102 in FIG. 2 wherein the cathodochromic projection CRT is shown as 101, having an image screen again numbered 5. The cathodochromic powder is deposited on a substrate 8A, to form the image screen 5. In operation, an image is written on the screen 5 by the electron gun 1. A white light source 2 then illuminates the screen and reflects the image into a collecting mirror 10 which projects the image through the faceplate shown at 11 of the CRT. After passing through the faceplate, the image is corrected for spherical aberrations by a Schmidt plate 12 and then projected onto a viewing screen again marked 7. After the image has been viewed, it can be erased by electron beam heating and the write-erase cycle repeated.

The cathodochromic CRT 101 in FIG. 2 has a magnetic focusing coil 13A and a magnetic deflection coil 13B. In this case, focusing of the electron beam is accomplished by passing a current, provided by a constant current supply 14, through the magnetic focusing coil 13A. Focusing can also be accomplished electrostatically, as is known in the art. The electron beam is accelerated toward the screen by a high voltage, usually 20kV–30kV, provided by a power supply 15, which also provides the appropriate voltages for the electron gun 1. Information is written on the image screen by a combination of modulation and deflection of the electron beam. Modulation circuits 16 send a signal to a blanking amplifier 17 which, in turn, raises the electron beam current from zero to full scale as read on an ammeter 18. These circuits are protected from internal CRT arcing by an arc protection circuit 19. The trigger circuits 16, in synchronism with the modulation circuits 16, trigger a sweep generator 20 which provides the appropriate voltage signals for positioning the electron beam. The voltage signals are then transformed to current waveforms by a deflection amplifier 21 and the currents, one for each axis, $x$ and $y$, pass through the deflection coil 13B, thus positioning the electron beam on the image screen 5 in the usual manner. (Deflection may, of course, be accomplished by electrostatic means.) In raster scan operation, the electron beam moves horizontally across the screen and vertically down the screen such that the desired screen area is encompassed. As the beam sweeps, it is modulated on and off in such a manner to write the desired information. The sweep rate of the beam must be sufficiently slow to provide adequate exposure for dark coloration but fast enough that no significant heating of the screen material occurs. Once information is written on the screen, it will remain almost indefinitely, or until it is intentionally erased. Erasure is accomplished by electron beam heating in the manner described fully in said application. Briefly, in this method, the electron beam is scanned, in a raster format, over the entire screen. In this case, the beam is maintained at constant intensity and turned-off only during re-trace. The beam exposure is chosen such that the screen material is heated sufficiently for erasure.

To maximize the advantage of the projection system, it is necessary to use a very small electron beam spot size for writing. This allows the information to be compacted into a small area and, hence, reduces the erase time which is proportional to screen area. In a system designed to present an 8½× 11 inches display consisting of 2000 horizontal lines, a screen size approximately 1.6 × 2.0 inches can be used, assuming a 1 mil, 0.001 inch, spot size for the writing electron beam. Erasing can be achieved by using a 10 mil, 0.010 inch, electron beam spot size, a beam current of 500 $\mu$ amps and an acclerating voltage of 30kV. Full screen erasure can be achieved in approximately one second with the above settings and when employing a screen material consisting of sodalite bromine as described in said application. To achieve the 1 mil writing spot size, the electron beam current is reduced to about 10 $\mu$ amps. The full screen in this circumstance can be colored to greater than a 6:1 contrast ratio in about seven seconds using the above screen material and an accelerating voltage of 30kV. Therefore, an 8½× 11 inches document can be presented in a 2000 line display with a page writing rate of seven seconds and complete erasure in one second, with less time required for selective erase.

In the writing mode: the electron beam current is adjusted to a value which will allow focusing the beam to the desired spot size (10 $\mu$ amps in the above example for a 1 mil spot size); a focus current is established to provide the desired spot size (1 mil in the above example); the vertical deflection amplitude is adjusted to compress the desired number of writing lines to fit the screen (2000 lines in a vertical height of 2 inches in the above example); and a horizontal sweep speed is used that gives the maximum contrast for a single sweep at the beam current and accelerating voltage setting used.

In the erase mode: the electron beam current is set at the value desired for erasure (typically 500 $\mu$ amps); a focus current is established to give a spot size of approximately 10 mils; the vertical deflection amplitude is adjusted such that the desired number of erase lines fit the screen (200 lines in a vertical height of 2 inches in the above example); a horizontal sweep speed is used to give erasure at the beam current and accelerating voltage setting used; and scanning is terminated after the screen area has been erased (i.e., 2000 horizontal lines in the above example).

Although the above discussion assumes the use of a single electron gun, two separate guns may be necessary to meet very high resolution requirements.

The construction of the cathodochromic image screen greatly affects the erasure and resolution characteristics of the display. FIG. 3a is a cross section of a cathodochromic image screen 5 deposited on a glass or metal substrate 8B for use in a rear surface projection system. Unlike front surface and transmission projection modes, the image screen may be several layers thick to insure that the rear surface particles are adequately thermally buffered from the substrate. The screen may be several times more dense than the 4 mg/cm$^2$ used in other projection modes. Since the rear surface designated 9A, which is the image surface for projection, consists of a layer of particles which are thermally buffered from the substrate 8B by the porosity of the intervening layers, these particles can be erased without significant heat loss to the substrate during erasure. An improvement in screen erasure can be effected by using the screen construction shown in FIG. 3b. In this case, a thick buffer layer 24 of unsensitized particles, i.e., those which will not color when exposed to high energy electrons, is deposited directly on the substrate 8B and then a layer of sensitized particles is deposited on the unsensitized layer. This construction insures that no coloration occurs beneath the top one or two layers of active particles that form the image screen 5. Coloration beneath these layers may be difficult to erase and hence may cause a gradual build-up of background coloration which would reduce the displayed contrast ratio. The particles comprising the buffer layer 24 should be large enough to insure the porosity (e.g., typically ~13 to 40 microns) which provides thermal insulation whereas particles of the image screen are typically ~4 to 13 microns.

Since the rear surface is to be magnified by the projection system, it is necessary that the rear surface 9A be as flat or smooth as possible. This cannot be accomplished by depositing a layer of very fine, sensitized particles directly on the substrate since the heat loss to the substrate during erasure would cause an inefficient erasure, as noted. Also, with the varying size and large size of the particles of the buffer layer (they are shown of uniform size in FIGS. 3b, 3c and 3d, but will vary greatly in practice) a smooth or flat surface 9A is difficult to obtain. However, the construction shown in FIG. 3c allows both the thermal buffering from the substrate and a smooth surface 9A even with fine sensitized particles as a screen material. In the construction of FIG. 3c, the thermal buffer layer 24 again consists of a thick layer of large unsensitized particles deposited on the substrate 8B. After this layer has been deposited and allowed to dry, a filler (e.g., of thin layer of glass or the like) is applied to the screen to fill the valleys between the large particles of the buffer layer 24 and form a smooth surface 25. The final active layer which consists of very fine, sensitized particles, is then deposited upon the smooth surface 25 to form the image screen 5. An improvement in the reflectivity of the screen can be achieved by evaporating a thin layer 26 of aluminum (or any reflective metal) on the filler-type surface 25 as shown in FIG. 3d, before depositing the active layer to form the image screen 5. As indicated by the broken line labeled 27 in FIG. 3c, the conductive layer 26 may be connected to the substrate 8B (if the latter is conductive and connected to a coating within the tube to form part of the tube anode) or the layer 26 may be connected to a conductive coating within the tube to form part of the tube anode. The construction in FIG. 3d permits a very thin (one or two particles thick) image screen. With the layer 26 immediately adjacent and connected as part of the anode circuit, electrons impinging on the image screen can be rapidly removed, thereby to prevent the screen from becoming charged.

The substrate may be either metal or glass. In the case of a metal substrate, the metal is part of the anode of the CRT. However, a glass substrate requires a conductive coating on the surface of the glass upon which the screen is deposited. This conductive coating serves as a portion of the anode. In addition to metal and glass, the substrate could also be a thin layer, such as mica, coated with a transparent conductor which would act as both a part of the anode and as a resistive heater to erase the image. One advantage of a thicker substrate, other than ease of construction, is that the substrate provides a good heat sink for the screen during projection so that the temperature rise in the screen is insufficient to cause any fading of the image.

Modifications of the invention herein disclosed will occur to persons skilled in the art and all such modifications are deemed to be within the spirit and scope of the invention as defined by the appended claims.

What is claimed is:

1. A cathode ray tube system that comprises a cathode ray tube having cathodochromic image screen means, means for directing an electron beam upon the image screen means thereby to write an image upon the image screen means, and means for projecting the image from the image screen surface upon which the electron beam first impinges, said surface being the part of the image screen means that gets the hottest due to the impinging beam.

2. A cathodochromic cathode ray tube adapted to permit electron beam write and erase, that comprises: a cathodochromic image screen supported by a substrate; an anode; an electron gun acting to write upon the image screen and to erase the image screen, both writing and erasing being effected by direct transfer of energy from the electron beam to the image screen without significant heat loss to the substrate; and projection display means that comprises means for projecting an image from the image screen surface nearest the electron gun.

3. A cathode ray tube system employing a cathodochromic cathode ray tube as in claim 2, that includes system means that act to erase with a high-current electron beam and to write with a low current, well-focused electron beam.

4. A cathode ray tube system as claimed in claim 3 in which the high- and low-current electron beams are provided by a single electron gun with regulated beam current and focus.

5. A cathode ray tube system as claimed in claim 3 in which erasure of the image screen is effected by scanning the screen with the electron beam, in a raster manner such that each horizontal line just slightly overlaps the adjacent horizontal line, the electron beam being of sufficient energy density to cause heating for erasure.

6. A cathode ray tube system as claimed in claim 3 having means to compress vertical and horizontal excursions of the electron beam, in the writing mode, to account for the decrease in electron beam spot size.

7. A cathode ray tube system as claimed in claim 3 having means to adjust the electron beam scan rate to give optimum exposure, depending on electron beam current and spot size and accelerating voltage, for either writing or erasing.

8. A cathode ray tube as claimed in claim 2 in which the means for projecting comprises a source of light that radiates in the visible region of the spectrum; means directing the light upon said image screen surface from which it reflects; and means to collect the reflected image and to redirect the same.

9. Apparatus as claimed in claim 8 in which the means directing the light is a spherical mirror that collects the reflected image and projects it toward the image screen and which includes a Schmidt correcting plate to correct for spherical aberrations in the image.

10. Apparatus as claimed in claim 9 that further includes a viewing screen to receive the corrected image.

11. A cathodochromic cathode ray tube adapted to permit electron beam write and erase, that comprises, a cathodochromic image screen supported by a substrate; an anode; electron gun means that acts to write upon the image screen and to erase the image screen; and projection display means that comprises means for projecting an image from the image screen surface nearest the electron gun, said cathode ray tube having an electrically conductive substrate that forms part of the anode of the cathode ray tube and is sufficiently thick to support the image screen, a thermal insulating barrier upon the substrate, and a sensitized cathodochromic material layer supported by the thermal insulating barrier, the latter being the image screen of the cathode ray tube and being insulated from the conductive substrate by the thermal insulating layer.

12. A cathode ray tube as claimed in claim 11 in which the image screen surface is about 1.6 × 2.0 inches, in which the means for projecting comprises a source of light that radiates in the visible region of the spectrum, said cathode ray tube further including means for directing the light upon said surface from which it is reflected and means to collect the reflected light and to redirect the same past the image screen.

13. A cathode ray tube as claimed in claim 12 in which said means to collect is a mirror, annular in form, positioned within the cathode ray tube envelope between the image screen and the electron gun, the electron beam being directed through the central aperture of the annulus and upon the image screen, the image reflected from the screen being collected by the annular mirror and projected past the image screen through a correcting plate and toward a viewing screen.

14. A cathodochromic cathode ray tube adapted to permit electron beam write and erase, that comprises, a cathodochromic image screen; an anode; an electron gun acting to write upon the image screen and to erase the image screen; and projection display means that comprises means for projecting an image from the image screen surface nearest the electron gun; said image screen being supported by a substrate, a thick thermal buffer layer of unsensitized particles disposed upon the substrate and an outer layer of fine sensitized particles forming the image screen that receives an electron beam from the electron gun to perform write and erase functions, electrons of said beam in their travel from the electron gun to the anode striking first the layer of sensitized particles, thereby dissipating most of the electron energy in said sensitized layer and focusing an image there.

15. Apparatus as claimed in claim 14 in which a layer of a reflective metal is interposed between the buffer layers and the layer of sensitized particles.

16. Apparatus as claimed in claim 15 in which the layer of reflective metal is connected to form a portion of the anode circuit of the cathode ray tube.

17. A cathode ray tube as claimed in claim 14 in which the particles forming the buffer layer are large enough to insure the porosity needed to provide good thermal insulation.

18. A cathode ray tube as claimed in claim 17 in which there is a filler layer which fills the valleys of the large particles of the buffer layer, interposed between the buffer layer and the outer layer of fine sensitized particles.

19. A cathode ray tube as claimed in claim 18 in which there is a thin layer of a reflective metal interposed between the filler layer and the outer layer of fine sensitized particles.

20. A cathode ray tube as claimed in claim 19 in which the thin layer of reflective metal is connected as part of the anode circuit of the cathode ray tube.

* * * * *